Dec. 3, 1957    E. E. SCHWARZENBACH ET AL    2,815,411
ELECTRIC SWITCH
Filed Dec. 8, 1954                              2 Sheets-Sheet 1
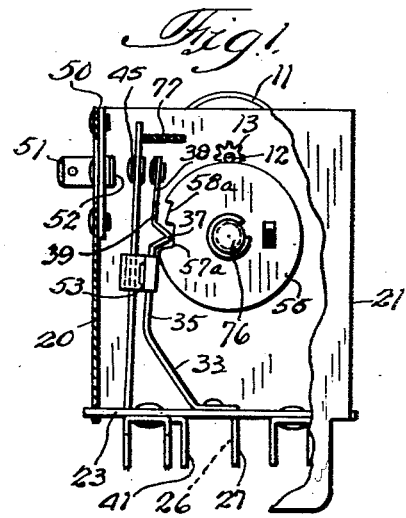
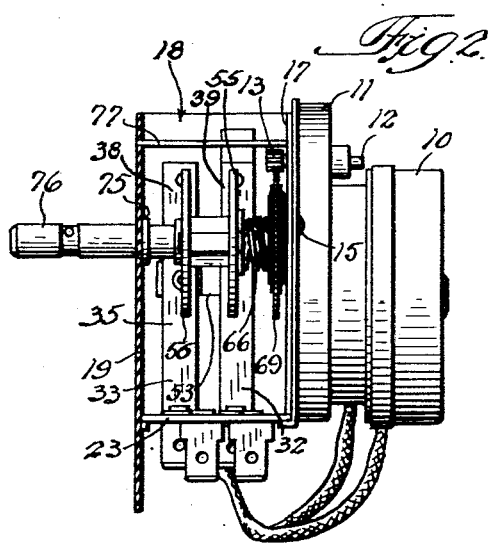
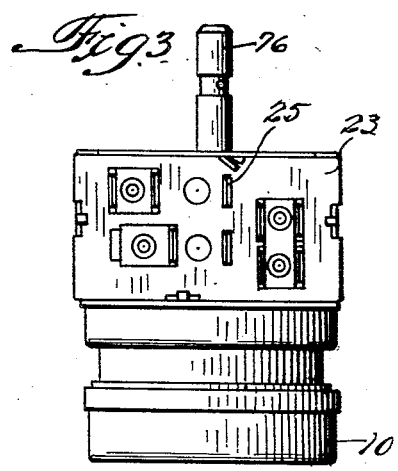
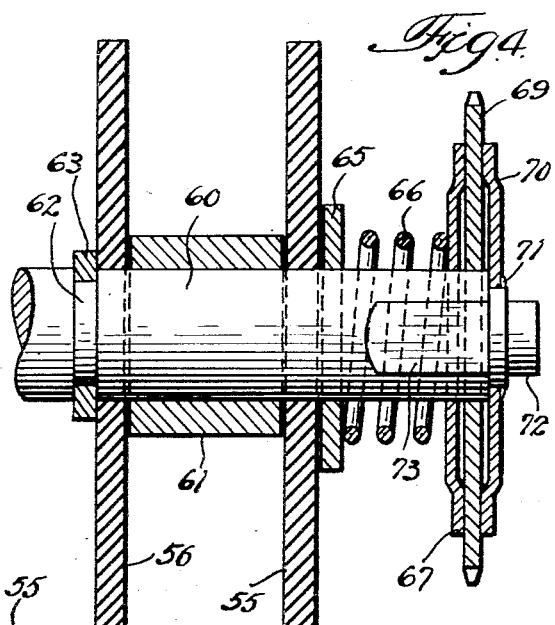
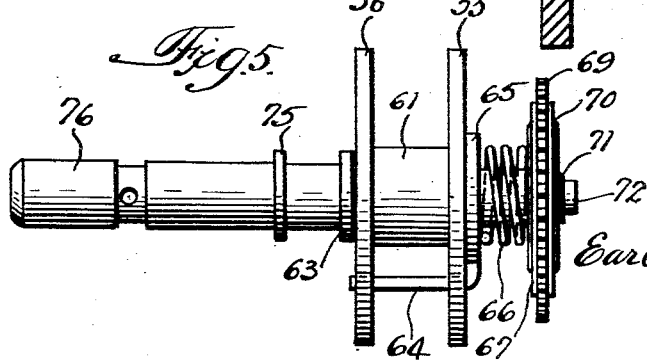
INVENTORS
Earl E. Schwarzenbach
BY James T. Williams.
Robert L. Kahn

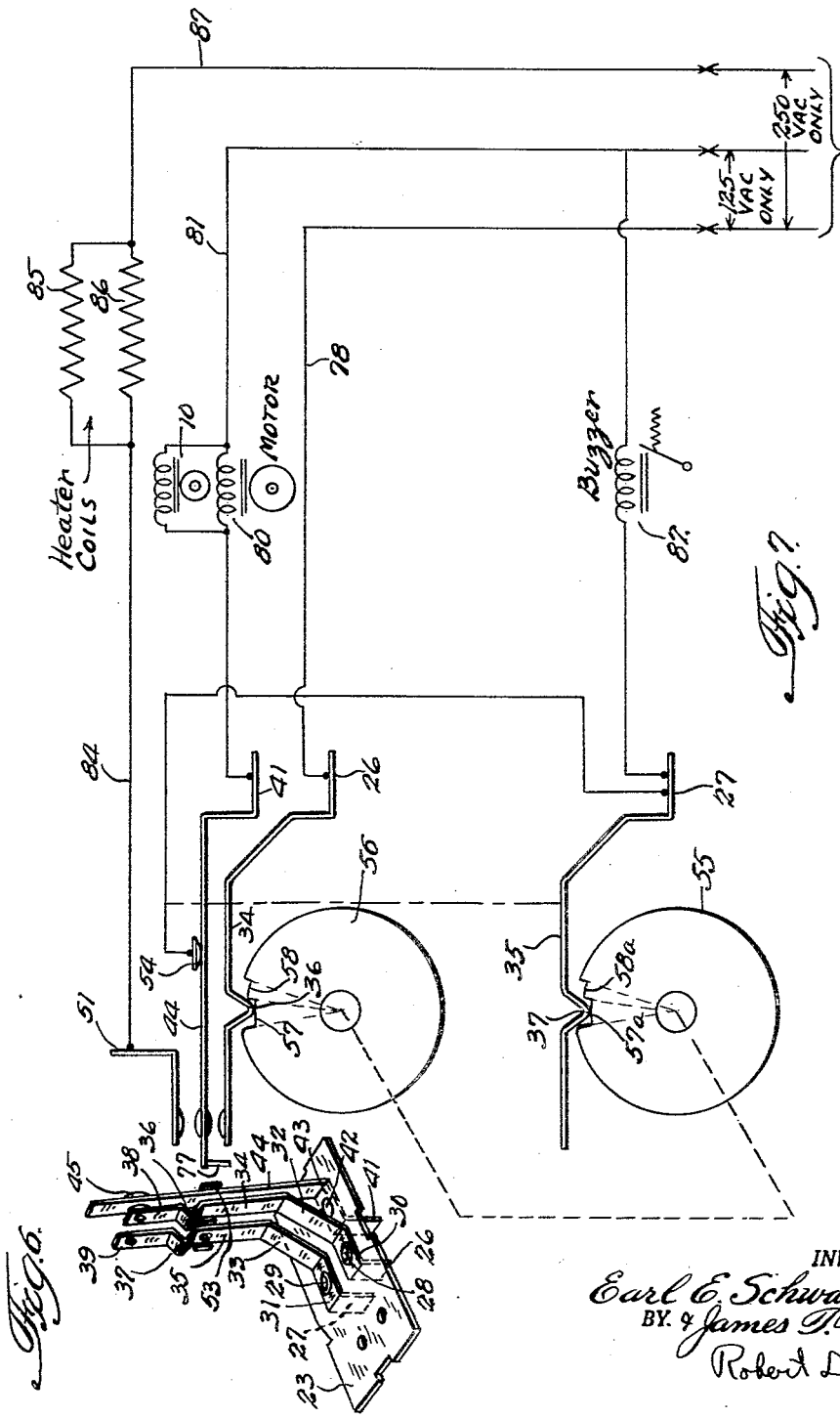

United States Patent Office 2,815,411
Patented Dec. 3, 1957

2,815,411

ELECTRIC SWITCH

Earl E. Schwarzenbach, Niles, Ill., and James T. Williams, St. Joseph, Mich., assignors to Oak Mfg. Co., Chicago, Ill., a corporation of Illinois Application December 8, 1954, Serial No. 473,851

2 Claims. (Cl. 200—38)

This invention relates to an electric switch and particularly to a time-controlled electric switch mechanism which may be used for electrical appliances for the purpose of closing or opening certain circuits at predetermined time intervals. In particular, the switching means forming the subject matter of the present invention is particularly adapted for use with electric appliances such as electric clothes dryers and the like.

In order that the invention may be understood, it will now be disclosed and explained in connection with the drawings wherein an exemplary embodiment of the invention is illustrated, it being understood that variations may be made without departing from the scope of the invention except as defined by the appended claims.

Referring to the drawings,

Figure 1 shows an end view of a device embodying the present invention, certain parts being broken away.

Figure 2 is a side view of the electric switch illustrated in Figure 1, certain parts being shown in section or being broken away.

Figure 3 is a bottom view of the mechanism illustrated in Figures 1 and 2.

Figure 4 is an enlarged sectional view of the clutch and cams of the electric switch.

Figure 5 is an enlarged sectional view of the shaft and cams to illustrate some details not clearly shown in Figure 4.

Figure 6 is a detail of the stationary and movable contacts and their mounting.

Figure 7 is a schematic diagram of the new electric time switch and an exemplary circuit with which the time switch may be used.

A device embodying the present invention includes electric motor 10 having gear case 11 in which there is supported stub-shaft 12 carrying pinion 13. Motor 10 and its gear case together with shaft 12 and pinion 13 may be provided as a separately detachable and attachable unit, the motor preferably being of the alternating current synchronous type used for time control mechanisms. The entire motor and gear assembly is suitably attached as by bolts, one of which is shown in Figure 2 and indicated by 15, to plate 17 of metal housing generally indicated by 18. Housing 18 has wall 19 spaced from and parallel to plate 17. Side walls 20 and 21 connect plate 17 and wall 19. The compartment formed by housing 18 is closed at the bottom by insulating sheet 23 of any suitable material such as fiber or the like.

As it more clearly indicated in Figure 6, insulating support plate 23 has riveted thereto a number of electrical terminals generally indicated by 25. In particular, three terminals are provided. Thus referring to Figure 6, terminals 26 and 27 are riveted respectively at 28 and 29 to insulating plate 23. The metal forming terminals 26 and 27 has a generally Z shape with the terminal portions extending normal to insulating plate 23 and the mounting portions 30 and 31 lying against the surface of insulating plate 23. Terminal portions 26 and 27 at the bend joining the same to mounting portions 30 and 31 pass through slots in the insulating plate. Beyond mounting portions 30 and 31, each of the contact members continues to form sloping portions 32 and 33 respectively, these sloping portions terminating in straight spring portions 34 and 35 respectively. Spring portions 34 and 35 are shaped to provide V portions 36 and 37 with the metal extending beyond the same to form end portions 38 and 39. The tip of contact-supporting portion 38 is provided with a contact button.

Spring members 34 and 35, together with the terminal portions, are respectively of one strip of suitable material such as spring brass, Phosphor bronze and the like, and are disposed in side-by-side relation as illustrated in Figure 6.

Carried by insulating strip 23 is terminal 41 which is riveted at 42 immediately to the rear of rivet 28. Terminal 41 and body portion 43 and arm 44 are integral and also bent in the shape of a Z, arm 44, however, extending straight up from insulating member 23. Arm portion 44 also extends through a slot in insulating member 23 and carries contact button 45 extending on both sides thereof, the contact button cooperating with a contact button carried by portion 38. Normally, contact button 45 is free of contact button on portion 38.

It is preferred to have V portions 36 and 37 of the spring arms alined as illustrated in Figure 6 for a purpose which will be apparent later in connection with the description of the operation of the device.

Wall 20 of the metal housing carries insulating contact mounting strip 50 upon which is secured terminal 51 riveted to the mounting strip, the terminal passing through a slot in the mounting strip to the interior of the housing and the terminal itself being rigidly attached to fixed contact 52. As will be apparent in Figure 1, fixed contact 52 is in line with movable contact button 45 carried by spring arm 44 and these two contacts are normally spaced apart.

Spring arm 35 carries auxiliary contact arm 53 which extends laterally of arm 35 and overlies a portion of spring arm 44 and cooperates therewith for contact making and breaking. Arm 53 has its end formed into contact button 54 which cooperates with a suitable part of spring arm 44.

The various contact arms are adapted to be operated by means which will now be described. Cooperating with V portion 36 of spring arm 34 is cam 56 while cooperating with spring arm 35 is cam 55. These two cams are generally similar except for certain dimensions and consist of circular discs of insulating material or the like. Cam 56 has steps 57 and 58, these steps adjoining and forming depressions in the periphery of the cam. Cam 55 has steps 57a and 58a. For the immediate purposes at hand, steps 57 and 58 respectively have somewhat larger angular extent than steps 57a and 58a. The timing of the cams and V portions 36 and 37 of the contact members are designed to obtain desired switching sequence.

Cams 55 and 56 are suitably supported on shaft 60, the cams being maintained in spaced relation by sleeve 61 of any suitable material. Shaft 60 is grooved at 62 just beyond cam 56, groove 62 accommodating C washer 63 for preventing movement of the cams longitudinally of shaft 60 in one direction. Cams 55 and 56 are maintained in alignment by finger 64 passing through suitable slots in the cams, finger 64 being carried by washer 65 disposed around shaft 60. Washer 65 is staked to shaft and prevents movement of cams longitudinally of shaft in one direction and has one end of clutch coil spring 66 resting against the same. Coil spring 66 is disposed around shaft 60, the coil spring having its other end bearing against dished clutch plate 67 of such material as steel, for example.

Loosely disposed around the end of shaft 60 adjacent to clutch plate 67 is gear 69 which is adapted to mesh with pinion 13. Shaft 60 carries at the end thereof dished plate 70 for providing lateral support for gear 69. It is understood that plate 70 is rigidly supported on shaft 60 in any suitable manner, such as for example by peaning the shaft material at 71 against plate 70. Shaft 60 has end 72 reduced in diameter and adapted to be disposed in a suitable aperture in plate 17 as a bearing.

Plates 67 and 70 on opposite sides of gear 69 are preferably dished as shown, plates 67 and 70 being of steel, for example, while gear 69 may be of brass. As is evident from Figure 4, the construction described constitutes a clutch with plates 67 and 70 rotatably attached to shaft 60 while gear 69 is frictionally engaged between these two plates by the action of coil spring 66. In order to lock plate 67 to shaft 60, the shaft may have flattened portions, one of which is illustrated at 73. The reason for the clutch is to make it possible to manually set cams 55 and 56.

Shaft 60 extends through a suitable aperture in wall 19 of the housing and the shaft may have collar 75 disposed in a suitable groove in the shaft, the collar lying just inside of wall 19 to prevent shaft 60 from being pulled out of the housing. Shaft 60 has shaft portion 76 extending outside of the housing, such portion being adapted to accommodate a knob or a handle which may cooperate with suitable indicators.

Extending between walls 17 and 19 of the housing near the top thereof is insulating strip 77. This insulating strip may pass through suitable slots in walls 17 and 19 and is so disposed that the edge may engage the tip of contact arm 44. Thus insulating strip 77 will cooperate with the contact arm for desired contact action.

As one example of a system with which the time switch may be used, reference may now be made to Figure 7 wherein a diagrammatic illustration of various parts of an electric dryer is given. Thus terminal 26 of the switch may be connected by wire 78 to one terminal of a 230-volt alternating current power line. Terminal 27 is electrically connected through arm 53 to contact 54. Terminal 41 is connected to one terminal of the winding of motor 10 and to one terminal of the winding of an alternating current motor 80. The other terminal of each winding is connected by wire 81 to the neutral wire of the three-wire 230-volt line. Neutral wire 81 is also connected through a buzzer 82 to terminal 27. Terminal 51 is connected by wire 84 to heater coils 85 and 86, these two coils being connected in parallel between wires 84 and 87. Wire 87 is connected to the other terminal of the three-wire 230-volt line.

The operation of the device as connected above in Figure 7 is as follows. Assume that cams 55 and 56 are turned clockwise from the position illustrated in Figure 7, enough to cause V portions 36 and 37 to be outside of the steps of the cam and rest upon the circular periphery thereof. As soon as this occurs, contact 54 will be clear of spring arm 44 with the result that spring arm 35 and terminal 27 will be dead. Thus there will be no current flowing through buzzer 82. Contact arm 34 will be raised against arm 44. An energizing circuit for motors 10 and 80 will be established from wire 81 through motor windings through contact arm 44 and contact button 45 to contact arm 38 and thence to terminal 26 to wire 78. Thus motors 10 and 80, which are 110-volt motors, will operate. Motor 10 will determine the duration of the dryer cycle. Motor 80 will operate the basket containing the clothes in the dryer. Spring arm 34 will be raised sufficiently high to force arm 44 against contact 52. Thus the contact buttons on opposite sides of contact 45 will touch each other. In spite of the upward movement of contact arm 44, this being caused by arm 34 being raised by the cam, arm 35 on cam 56 will be raised sufficiently high so that contact button 54 will remain clear of contact arm 44.

The engagement of the contact buttons on the two sides of contact button 45 will cause a circuit to be completed from wire 87 through heaters 85 and 86 in parallel to wire 84, terminal 51 through the three contact buttons to arm 34, thence to terminal 26. Thus the heater coils will be energized. It is understood that the heater coils may be controlled by suitable thermostats if desired, such thermostats being connected in series with one or more heating coils.

As motor 10 operates, cams 55 and 56 are rotated clockwise as seen in Figure 7. Because of the arrangement of steps 57 and 58 on the one hand and steps 57a and 58a on the other hand, spring arm 34 will drop to step 58 a short time before spring arm 35 drops to step 58a. When spring arm 34 drops to step 58, contact arm 44 follows. Contact button 45 will still be closed on arm 34. Thus motors 10 and 80 will continue to operate. However, with contact 45 dropping clear of contact 52, the circuit for the heater coils will be open.

Shortly after spring cam 34 has dropped to step 58, V portion 37 of spring arm 35 drops to step 58a. No circuit changes occur, although contact 54 is just above arm 44. V portion 37 now drops to step 57a. This drops contact 54 on arm 44 and closes a circuit for buzzer 82 through arm 35. Motors 10 and 80 are still operating. A short time after buzzer 82 begins to sound, V portion 36 drops on step 57, thus dropping contact arm 34 clear of contact 45. The circuits are as shown, the motors and buzzer being dead.

What is claimed is:

1. A time switch comprising an electric motor assembly having an output shaft, a pinion on said shaft, a housing, a second shaft, means for mounting said second shaft in said housing for rotation, a gear on said second shaft meshing with said pinion, a pair of plates carried by said second shaft and rotatably secured thereto, said plates being on opposite sides of the gear and constituting clutch plates, a coil spring around said second shaft, said spring having one end pressing on one clutch plate, a pair of insulating discs on said second shaft so that said spring is between said insulating discs on the one hand and between the clutch plates on the other hand, a metal washer disposed between the other end of the coil spring and the nearest disc, said washer having a finger passing through disc slots to rotatably couple the discs to the washer, said discs having cam portions formed on their peripheries, said disc having cut-out portions at the peripheries, one disc cut-out portion subtending a larger angle than the other disc cut-out portion; electric switches supported on said housing, said switches having parts cooperating with the cam discs for actuation thereby and including spring fingers having portions engaging said cut-outs, said switches including one arm for one cam disc, a second arm for the other cam disc, a third arm so disposed that the second arm is between its disc and the third arm, a fourth arm on the side of the third arm remote from the second arm so that the third arm is between the second arm and the fourth arm, contacts carried by said second, third and fourth arms, an insulating strip carried by said housing and cooperating with the free end of the third arm to limit the movement thereof toward the disc, means for mounting said first three arms at one end of each arm so that the free ends may move in response to the spring therein, said third arm having its contact free of the contact on the fourth arm when limited by the insulating strip in moving toward the contact disc, a finger carried by the first arm and extending laterally to the side of the third arm remote from the disc, said first arm and finger being adapted to cause pressure on the third arm to move the same against the second arm when the first arm encounters the cut-out portion in its cam disc, said finger being clear of the third arm at other positions of said cam disc, said second arm when free of the cut-out portion of the cam urging said third arm against the contact of the fourth arm so that the contacts on the second, third and fourth arms are in engagement for predetermined parts of the insulating cam disc.

2. In combination, a timer including a housing, an electric motor and gear train driving a shaft, a pair of spaced parallel cam discs driven by said shaft, said cam discs having their peripheries as cam surfaces and having cut-out portions at the peripheries, one disc cut-out portion subtending a larger angle than the other disc cut-out portion, electric switches controlled by said cam discs, said switches including spring portions engaging the cam peripheries, said switches including one arm for one cam disc, a second arm for the other cam disc, a third arm so disposed that the second arm is between its disc and the third arm, a fourth arm on the side of the third arm remote from the second arm so that the third arm is between the second arm and the fourth arm, contacts carried by said second, third and fourth arms, an insulating strip carried by said housing and cooperating with the free end of the third arm to limit the movement thereof toward the disc, means for mounting said first three arms at one end of each arm so that the free ends may move in response to the spring therein, said third arm having its contact free of the contact on the fourth arm when limited by the insulating strip in moving toward the contact disc, a finger carried by the first arm and extending laterally to the side of the third arm remote from the disc, said first arm and finger being adapted to cause pressure on the third arm to move the same against the second arm when the first arm encounters the cut-out portion in its cam disc, said finger being clear of the third arm at other positions of said cam disc, said second arm when free of the cut-out portion of the cam urging said third arm against the contact of the fourth arm so that the contacts on the second, third and fourth arms are in engagement for predetermined parts of the insulating cam disc.

References Cited in the file of this patent

UNITED STATES PATENTS

| | | |
|---|---|---|
| 2,424,116 | Puerner | July 15, 1947 |
| 2,530,985 | Morrison | Nov. 21, 1950 |
| 2,565,735 | Markley et al. | Aug. 28, 1951 |
| 2,603,725 | Dietrich | July 15, 1952 |
| 2,608,082 | Jones | Aug. 26, 1952 |
| 2,650,286 | Ramos | Aug. 25, 1953 |
| 2,671,841 | Vaksvik et al. | Mar. 9, 1954 |
| 2,678,095 | Chapman | May 11, 1954 |
| 2,742,538 | Grandstaff | Apr. 17, 1956 |